May 16, 1950
R. G. AURIEN
2,508,211
CLASP BRAKE
Filed Jan. 2, 1948
2 Sheets-Sheet 2
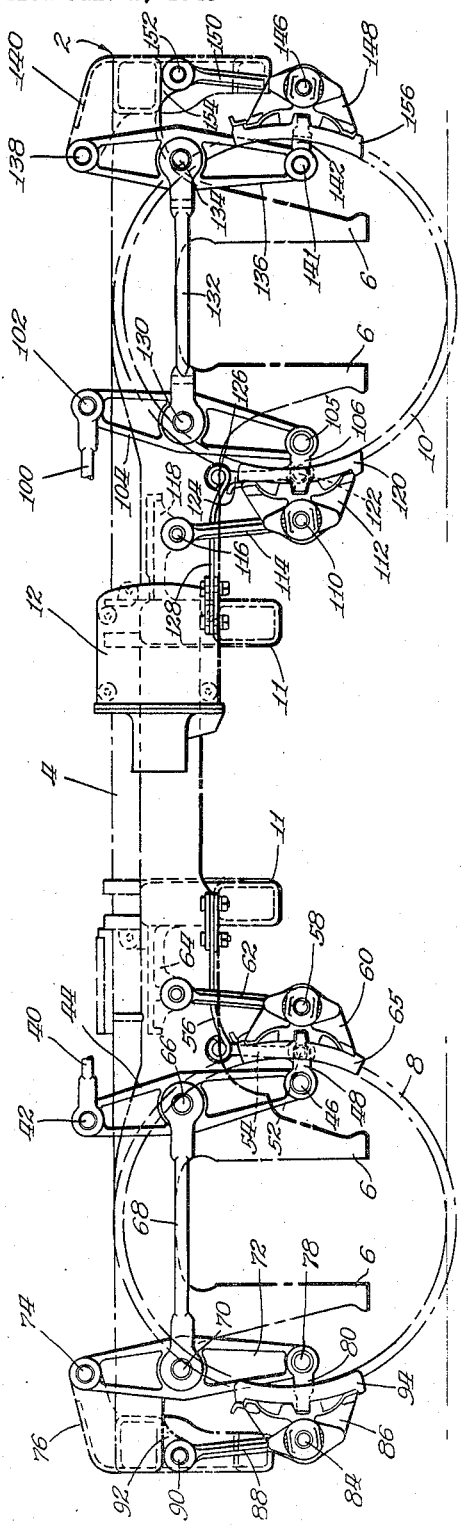
INVENTOR.
Ray G. Aurien
BY
Orrin O. B. Garner
Atty Patented May 16, 1950

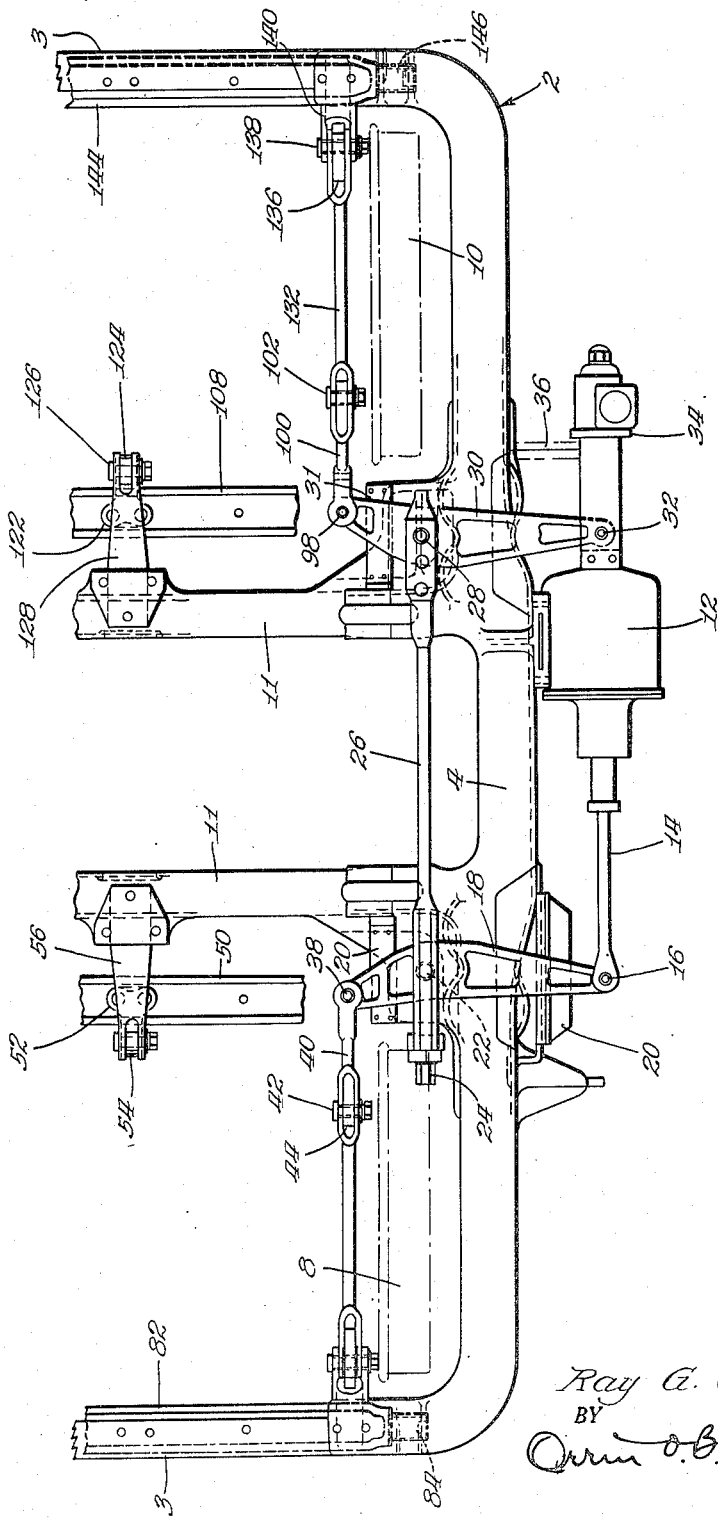

2,508,211

UNITED STATES PATENT OFFICE 2,508,211

CLASP BRAKE

Ray G. Aurien, Chicago, Ill., assignor to American Steel Foundries, Chicago, Ill., a corporation of New Jersey Application January 2, 1948, Serial No. 134

7 Claims. (Cl. 188—56)

This invention relates to railway brake rigging.

An object of the invention is to devise brake rigging of the type adapted for use with railway cars, wherein the parts are formed and arranged to compensate for frictional transmission loss of braking power so as to secure substantially uniform braking pressures in the rigging, that is, at all points of its engagement with the associated car wheels.

Another object of the invention is to provide brake rigging of the type described wherein the parts are designed to positively prevent accidental misarrangement of the parts during assembly.

Another object of the invention is to design such brake rigging as described which is efficient in use, rugged in construction, and economical to manufacture.

A specific object of the invention is to provide a brake rigging in which the levers remote from the power source have a greater leverage ratio than those adjacent the power source to compensate for power loss in transmission due to frictional resistance in the connections between the levers to thereby obtain substantially equal pressures on the brake shoe assemblies associated with the respective levers.

These and other objects of the invention will be apparent from the specification and the drawings, wherein:

Figure 1 is a top plan view of one half of a car truck embodying the features of the present invention, only one half of the truck being shown inasmuch as it is symmetrical about its longitudinal center line;

Figure 2 is a side elevation of Figure 1; and

Figure 3 is an end view of Figures 1 and 2, taken from the left thereof.

In each of said figures certain details may be omitted where they are more clearly seen in other views.

Describing the structure in detail, the truck, generally designated 2, comprises end rails 3, 3 at opposite ends thereof connected to a side rail 4 at opposite sides of the truck. The side rail 4 is provided at opposite ends thereof with integral jaws or spaced pedestals 6, 6 forming conventional means for connecting wheel and axle assemblies 8 and 10 to the truck frame at opposite ends of the truck through journal boxes (not shown). The side rails are integrally connected adjacent the center of the truck by transversely extending transoms 11, 11, between and from which may be suspended a bolster assembly (not shown) in the usual manner.

Inasmuch as the braking arrangement is the same at each side of the truck, only one side, as shown, will be described.

A power unit in the form of a cylinder 12 is mounted on the outboard side of the side rail 4 intermediate the ends thereof, the cylinder having a piston stem 14 extending longitudinally of the truck and having a pivotal connection as at 16 with the outboard end of a live cylinder lever 18 extending transversely of and overlying the side rail.

The lever 18 is slidably supported adjacent opposite ends thereof by means of brackets 20, 20 formed on the inboard and outboard sides of the side rail 4 and is pivotally connected intermediate its ends as at 22 through a manual slack adjuster 24 to one end of a pull rod 26, the latter having a pivotal, adjustable connection at its opposite end as at 28 to a dead cylinder lever 30 intermediate the ends thereof.

The dead cylinder lever extends transversely of and overlies the side rail 4 and is slidably supported at its inboard end by means of a bracket 31 on the side rail 4. The outboard end of lever 30 is pivoted as at 32 to an automatic slack adjuster 34 which is fixed at one end to the cylinder 12 and is supported from the side rail by a bracket 36.

The inner end of the live cylinder lever 18 is pivoted as at 38 to one end of a pull rod 40, said pull rod 40 having a pivotal connection at its opposite end with the upper end of a substantially vertical live truck lever 44 by means of a pin 42 extending through complementary openings in the pull rod and the upper end of said live truck lever 44. The live truck lever 44 is disposed intermediate the wheel and axle assemblies 8 and 10 adjacent assembly 8 and is pivoted at its lower end as at 46 to fulcrum 48 on a brake beam 50.

The beam 50 extends transversely of the truck and is provided with a fulcrum 52 substantially at the longitudinal center line of the truck, said fulcrum 52 having a pivotal connection to the lower end of a balance hanger 54, the hanger 54 being pivotally connected at its upper end to a supporting member 56 which is fixed to the adjacent transom 11.

The beam 50 is provided at the end thereof with a trunnion 58 on which is pivoted a brake head 60 and the lower end of a supporting hanger 62. The upper end of the hanger 62 is pivoted to a bracket 64 formed integral with the side rail and adjacent transom 11.

The brake head 60 carries a shoe 65 adapted for engagement with the periphery of the adjacent wheel of assembly 8.

The live truck lever 44 is pivotally connected intermediate its ends as at 66 to one end of a pull rod 68 which passes over the axle of assembly 8, the pull rod 68 having a pivotal connection at its opposite end as at 70 with a substantially vertical dead truck lever 72 intermediate the ends thereof. The upper end of lever 72 is pivoted by means of a pin 74, said pin 74 extending through complementary openings in the upper end of lever 72 and a bracket 76, said bracket being formed integral with the adjacent end rail 3 of the truck. The lower end of lever 72 is pivoted as at 78 to a fulcrum 80 on brake beam 82.

The beam 82 is provided with a trunnion 84 at its end, said trunnion 84 pivotally supporting a brake head 86 and affording a pivotal connection for the lower end of a supporting hanger 88, the upper end of said hanger 88 being pivoted as at 90 to a depending bracket 92 formed integral with the adjacent end rail 3. The brake head 86 carries a shoe 94 adapted for engagement with the associated wheel of assembly 8.

Considering now the brake arrangement for the wheel and axle assembly 10, the inner end of the dead cylinder lever 30 is pivoted as at 98 to one end of a pull rod 100, the other end of which is pivoted to the upper end of a live truck lever 104 by means of a pin 102 extending through complementary openings in the last-mentioned end of pull rod 100 and the upper end of live truck lever 104, said lever 104 being disposed intermediate said assemblies adjacent assembly 10 and having a pivotal connection at its lower end as at 105 to a fulcrum 106 on a brake beam 108.

A trunnion 110 is provided at the end of beam 108, said trunnion 110 affording a pivotal support for a brake head 112 and a pivotal connection for the lower end of a supporting hanger 114.

The upper end of hanger 114 is pivoted as at 116 from a bracket 118 formed integral with the side rail 4 and adjacent transom 11.

The brake head 112 carries a brake shoe 120 adapted for engagement with the periphery of the adjacent wheel of the assembly 10.

The brake beam 108 is provided with a fulcrum 122 at substantially the longitudinal center line of the truck, said fulcrum 122 being pivoted to the lower end of a balance hanger 124, the upper end of said hanger 124 being pivoted as at 126 to a support member 128 fixed to the adjacent transom 11.

The live truck lever is connected intermediate its ends as at 130 to one end of a pull rod 132, said pull rod 132 passing over the axle of assembly 10 and having its opposite end pivoted as at 134 to a dead truck lever 136 intermediate the ends thereof.

The upper end of lever 136 is pivoted to a bracket 140 by means of a pin 138 extending through complementary openings in said bracket and upper end of said lever 136, said bracket 140 being formed integral with the adjacent end rail 3. The lower end of lever 136 is pivoted as at 141 to a fulcrum 142 on brake beam 144.

The beam 144 is provided with a trunnion 146 at its extremity, said trunnion carrying a brake head 148 and affording a pivotal connection for the beam 144 with the lower end of a supporting hanger 150, the upper end of hanger 150 being pivoted as at 152 from a bracket 154 formed on the adjacent end rail 3.

Referring now to Figure 2, it will be understood that the levers 44, 72, 104 and 136 are of equal length; the distance however, between the pivot points 70 and 74 of lever 72 is greater than the distance between pivot points 42 and 66 of lever 44, and also, the distance between pivot points 70 and 78 of lever 72 is less than the distance between pivot points 46 and 66 of lever 44. Similarly, the distance between the pivot points 134 and 138 of lever 136 is greater than the distance between the pivot points 102 and 130 of lever 104 and also the distance between the pivot points 134 and 141 of lever 136 is less than the distance between pivot points 105 and 130 of lever 104. This arrangement affords the dead or outer levers 72 and 136, which are remote from the power cylinder, a mechanical advantage over the live levers 44 and 104 in that the leverage ratios of the dead levers are greater than those of the live levers, thus compensating for transmission loss of braking power to the outer shoes 94 and 156 so as to secure braking pressures on these outer shoes substantially equal to that imposed upon the inner shoes 65 and 120. It will be appreciated that in transmitting braking power from lever 44 to shoe 94 and from lever 104 to shoe 156, frictional loss of braking power occurs at the various points of connection in the rigging between the levers and the respective shoes.

In order to prevent the possibility of misarranging the levers in assembling the brake, the pivotal connections at 74 and 138 for levers 72 and 136 are larger than any other pivotal connections of levers 44, 72, 104 and 136, that is, the pivot pins and openings in levers 72 and 136 at points 74 and 138 are the same, but much larger than the pins and openings in all the levers at all their other pivotal points.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a clasp brake rigging, the combination of a truck frame, spaced wheels supporting said frame, a live truck lever on one side of each wheel, a dead truck lever on the other side of each wheel, said truck levers being of substantially equal length, power means and slack adjuster means mounted on said frame, live and dead cylinder levers connected at their outer ends to said power means and slack adjuster means, respectively, and connected to each other intermediate their ends, pull rods connected to the inner ends of said cylinder levers, a pivotal connection between each pull rod and the upper end of the adjacent live truck lever, said pivotal connections comprising pins extending through complementary openings in the respective pull rods and live truck levers, a link extending between the truck levers associated with each wheel and pivoted at one end to the associated live truck lever at a point intermediate the ends thereof and pivoted at its other end to the associated dead truck lever at a point spaced a greater distance from the upper end of said dead truck lever than the distance between said point of pivot of said pull rod on said live truck lever and the upper end thereof, means fulcruming the upper ends of said dead truck levers comprising pins of different diameter than said first-mentioned pins extending through complementary openings in the respective dead truck levers and portions of the frame, and brake means connected to the lower ends of said truck levers.

2. In a brake arrangement, a truck including a frame, a wheel at each end of the frame in supporting relationship with respect thereto, truck levers intermediate said wheels disposed one adjacent each wheel, truck levers of substantially the same length as said first-mentioned levers and disposed outwardly of said wheels and having a greater leverage ratio than said first-mentioned levers, power means, connections between said power means and said first-mentioned levers, each of said connections including a pin extending through complementary openings in the upper ends of the respective of said first-mentioned levers, and means pivoting said second-mentioned levers from said frame comprising pins of a different diameter than the aforementioned pins extending through complementary openings in said frame and the upper extremities of the respective of said second-mentioned levers, the difference in dimensions of said pins and said openings preventing misarrangement of said levers during assembly thereof with said truck.

3. In a brake arrangement for a truck comprising a frame and a wheel and axle assembly, a live lever and a dead lever disposed at opposite sides of said assembly, each having upper, lower, and intermediate points of pivot, a rod connected to said levers at said intermediate points, brake means connected to respective levers at said lower points, means for actuating said levers connected to said live lever at said upper point, said upper and lower points of said levers being substantially equally spaced, the intermediate and lower points of said live lever being spaced a greater distance apart than the corresponding points of said dead lever in proportion to the frictional loss of power to said dead lever to substantially equalize the forces transmitted to said brake means, said dead lever having a pivotal connection at its upper point with said frame, each of said connections including a pin, the pin in the connection between said dead lever and the frame extending through complementary openings therein and being of a diameter different from the pins in the other of said connections.

4. In a brake arrangement for a truck comprising a frame and spaced wheel and axle assemblies, a pair of brake levers at opposite sides of each assembly, each lever comprising first and second points of pivot, and a third point of pivot between the first and second, a rod connecting each pair of levers at said third points, power means operatively connected to one lever of each pair at said second point, and brake means carried by each lever at said first point, the first and second points of each lever being substantially equally spaced, and the third point of said one lever of each pair being spaced closer to said second point than the corresponding points of the other lever of the pair and proportional to compensate for frictional loss of power to said other levers to substantially equalize the braking pressures on said brake means.

5. In a brake arrangement, a truck with a wheel and axle assembly, truck levers at opposite sides of said assembly and each comprising a first point of pivot at one end, a second point of pivot at the other end, and a third point of pivot intermediate the ends, a rod interconnecting said levers at said third points, brake means connected to respective levers at said first points, power means operatively connected to one of said levers at said second point, said first and second points of respective levers being spaced a substantially equal distance apart, and said first and third points of said one lever being spaced farther apart than the corresponding points of the other lever and proportioned in a ratio of the order to compensate for frictional power loss to said other lever to substantially equalize the braking pressures on said brake means.

6. In a brake arrangement for a truck comprising a frame and a wheel and axle assembly, operating means comprising live and dead levers each having upper, lower, and intermediate points of pivot, a rod connecting said levers at said intermediate points, brake means disposed at opposite sides of said assembly connected to respective levers at said lower points, and power means connected to said live lever at said upper point, the intermediate and lower points of said live lever being spaced a greater distance apart than the corresponding points of said dead lever and proportioned to substantially equalize the forces transmitted to said brake means.

7. In a brake rigging for a truck comprising a frame and a wheel and axle assembly, brake means at opposite sides of said assembly, and actuating means comprising live and dead levers connected at their lower ends to respective brake means, power means connected to the upper end of said live lever, and a link pivoted to said levers intermediate their ends, the point of pivot of said link with said live lever being spaced from the lower end of said live lever a distance greater than that between the point of pivot of said link with said dead lever and the lower end thereof to afford said dead lever a greater leverage ratio than said live lever of the order sufficient to compensate for frictional loss of power whereby the force transmitted to said brake means is substantially equalized.

RAY G. AURIEN.

REFERENCES CITED

The following references are of record in the file of this patent:

UNITED STATES PATENTS

| Number | Name | Date |
|---|---|---|
| 2,077,662 | Baselt | Apr. 20, 1937 |
| 2,084,073 | Baselt | June 15, 1937 |
| 2,327,157 | Tack | Aug. 17, 1943 |
| 2,386,907 | Pierce | Oct. 16, 1945 |